Aug. 18, 1931.    R. R. SMITH    1,819,129
BATTERY CASE
Filed Aug. 5, 1925
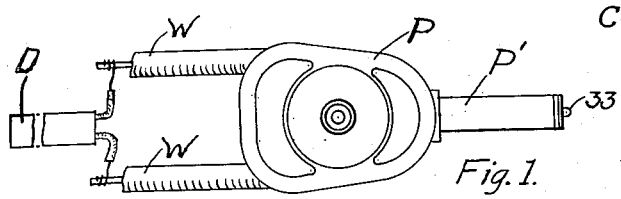
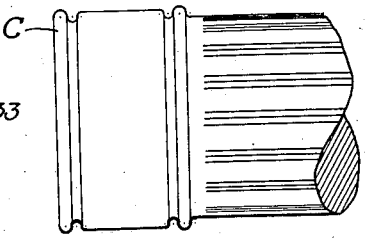
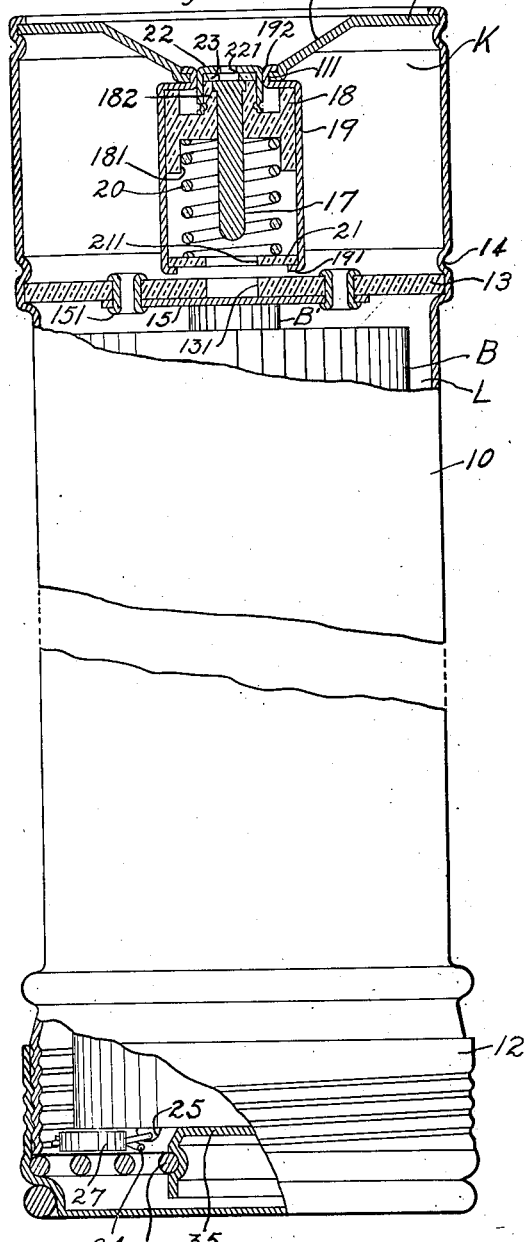
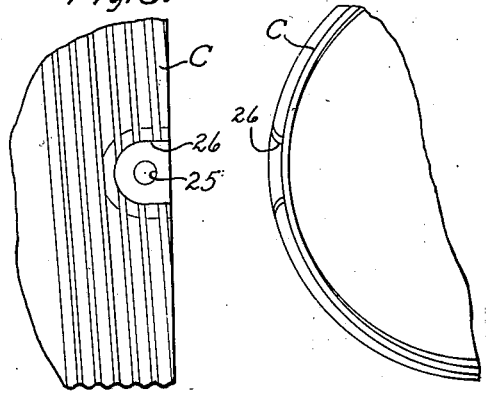
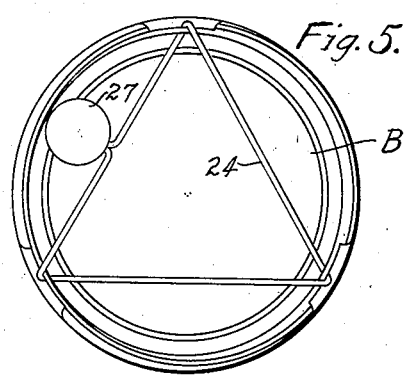
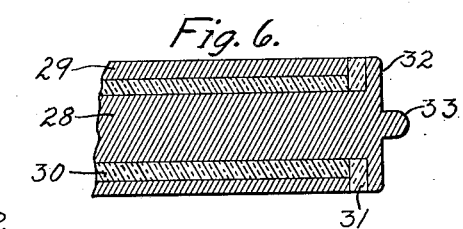
INVENTOR:
Ralph R. Smith,
BY
ATTORNEYS.

Patented Aug. 18, 1931

1,819,129

UNITED STATES PATENT OFFICE

RALPH R. SMITH, OF JACKSON HEIGHTS, NEW YORK, ASSIGNOR TO NATIONAL CARBON COMPANY, INC., A CORPORATION OF NEW YORK

BATTERY CASE

Application filed August 5, 1925. Serial No. 48,344.

This invention relates to electric shot-firing devices, and more particularly to an improved electric battery case and plug for use in firing electric squibs or detonators, and for supplying electric current for brief periods to other electrically operable devices.

In the electrical firing of squibs and detonators for igniting charges, it has been customary to use costly magnetos, as well as storage and dry battery outfits, to supply the required electric currents. The source of current is generally connected to the detonator by wires with or without an interposed switch to control the circuit. Closing the switch or making the last connection usually sets off the explosion as intended, but sometimes the explosion fails to occur because of some faulty connection or other break in the circuit. The workman may then investigate the cause of such failure without disconnecting the source of current and, in his manipulations, may accidentally close the circuit, thereby producing an unexpected explosion that usually has harmful results.

The primary object of this invention is to overcome the foregoing objectionable feature of firing devices and provide an encased source of electric current equipped with means which requires intentional manual application of the firing circuit terminals to deliver current to the detonator, and which automatically interrupts current flow whenever manually applied pressure on said terminals is released.

A further object of this invention is to arrange a portable source of current, such as a dry battery, so that wires leading to the detonator may not be secured thereto, but so that specially constructed firing circuit terminals may be readily temporarily electrically connected thereto.

Another object of this invention is to provide a battery case with a seal that will prevent unauthorized removal and improper use of the battery therein.

The objects and novel features of this invention will become apparent from the following description taken with the accompanying drawings, in which:

Fig. 1 is a diagram of a shot-firing system embodying this invention;

Fig. 2 is a side view, partly in section, of a battery case embodying this invention;

Figs. 3 and 4 are enlarged detail views of the rear end of the improved battery case;

Fig. 5 is a view of the lower end of the battery case, with the battery and seal in place; and Fig. 6 is a sectional view of a plug carrying the terminals of the shot-firing circuit.

One example of the application of this invention is diagrammatically illustrated in Fig. 1, wherein an electrically operable squib or detonator D is connected by conductors W, W to a plug P that is somewhat similar to the usual telephone plug and carries separate electric circuit terminals at its reduced end P', which is insertable into a socket in the front end of a battery case C to include the battery in said case in circuit with the detonator and thereby energize the latter. In order to supply current to the detonator D or other electrically operable device, it is necessary to manually press the terminal plug into the battery case against the pressure of a spring therein, which spring acts automatically to open the battery circuit whenever either the plug or battery case is released or one is separated from the other. The possibility of accidental explosions is thus greatly reduced.

As shown, the battery case C may consist of a tubular metallic shell 10 having a metal head plate 11 permanently secured in its front end, and a closure cap 12 threaded or otherwise detachably coupled to its lower end. The interior of the shell is divided into two compartments K, L by a partition of insulating material 13 that may be held in place by a bead 14 rolled in the shell. The compartment K constitutes the socket to receive the reduced end P' of the plug and contains the circuit making and breaking device. The other compartment L is designed to receive the source of electric current, such as the dry battery B which has a center electrode B' that is held firmly against a contact plate 15 by means, such as a conductive spring 16 carried by the adjustable closure cap 12. The contact plate 15 is secured to one side of the partition 13 over an aperture 131 therein by suitable means such as eyelets 151.

A contact pin 17 in the compartment K is movable axially of the case through the aperture 131 into engagement with the contact plate 15. The pin 17 is secured to an insulating plunger 18 axially movable in a cylindrical metal guide and spring housing 19 that is secured at one end to the inner edge of an aperture 111 at the center of the inwardly depressed part 112 of the front plate 11. The plunger 18 is normally held against the inside of the front end of the guide housing by a helical spring 20 which has one end seating in a recess 181 in the rear end of the plunger and its opposite end pressing against a centrally apertured insulating bearing plate 21 resting on the inturned bottom edge 191 of the guide housing.

A brass cap 22 having an insulating washer 23 therein is secured to and covers the front reduced end 182 of the plunger 18, which fits in the neck 192 of the guide 19 that is secured in the aperture 111 in the head plate. The pin 17 may have a head at its front end that seats in a recess in the reduced end of the plunger 18 opposite an aperture 221 in the cap 22, whereby electrical contact may be made with the pin 17 by a projection at the end of the plug member P'. By this arrangement the contact pin 17 is held firmly in position, and the head end of the battery case and the battery therein are sealed, since part of the mechanism for completing the circuit through the battery occupies the aperture 111 and closes the same. By the same arrangement, this part of the mechanism is flush with the outside surface of the case and so exposed that it is readily accessible for operation.

In order to completely seal the battery within the battery case, a sealing wire 24 is threaded through holes 25 located in inward depressions 26 at the lower end of the battery case. While any suitable number of holes or other means may be provided to retain the sealing device, as shown, three equally spaced holes 25 are desirably provided so that when a single length of sealing wire 24 is strung across between the holes and the ends are secured together by a leaden seal 27, a triangular wire mesh or partition is formed to prevent unauthorized removal of the battery B. The space within the wire seal is of sufficient size to permit the passage therethrough of the free end of the spring 16 or other conductive member that is carried by the cap 12 to support the battery B and form part of the electrical circuit of the latter. This seal serves as an added precaution, especially in shot-firing devices, to keep the workmen from removing the battery and permanently securing the shot-firing circuit thereto.

It is necessary to apply the plug P manually to the socket in the head end of the battery case in order to withdraw current from the battery therein. As shown in Fig. 6, the reduced end P' of this plug may have concentric terminal means such as a central conducting core 28 and an outer conducting sleeve 29 separated from each other by an insulating shell 30 and an insulating washer 31. The front of said core has a shoulder 32 and a projecting tip 33. The only difference between the said plug and the standard telephone plug is the tip 33 which is designed especially to fit into opening 221 in the brass cap 22 to engage the head of the pin 17. Of course, the usual means, not shown in the drawings, are provided in the plug for securing the ends of a pair of leads or wire conductors W, W of an external circuit which may include the squib or detonator D.

When the plug is inserted in the socket of the battery case and pressure is applied thereto by the operator, the tip 33 passes through the opening 221 and engages the head of the contact pin and forces the plunger 18 and pin 17 inwardly against the pressure of the spring 20 until the inner end of the contact pin passes through the apertures 211 and 131 and touches the contact plate 15. This operation electrically connects the external lead which is in electrical connection with the central core of the plug to the central positive electrode of the battery. Simultaneously with the foregoing operation the plug is tilted to effect an electrical contact between the plug sleeve 29 and the inner surface of the neck 192 of the guide 19 that is secured to the head plate 11 which completes the electric circuit of the battery, to cause a flow of current through the detonator. The path taken by the current is from the positive terminal of the battery to the conducting core of the plug, through the external circuit and back to the outer sleeve of the plug, and then from the casing to the coiled spring which is in contact with the bottom or negative electrode of the battery. A contact button 35 may be secured to the free end of the coiled spring 16 to keep the free end of the spring from entangling in the sealing wire and destroying the latter, and to provide a support and contact of greater area for the battery.

The passage of current through the squib D ignites the latter and explodes the charge, but in case the explosion fails to occur, the operator necessarily opens the battery circuit by laying aside the plug or battery case or both, before his hands are free to do anything else. As soon as the pressure is released from the spring 20 in the head of the battery case, the plunger 18 and pin 17 are automatically pushed to their initial position and the circuit is automatically opened. An inspection of the entire shot-firing system may now be made by the operator without the danger of an accidental explosion of the detonator occurring by current from the battery.

It is to be observed that by the use of an embodiment of the present invention a source of electric current only becomes available so long as pressure is manually and properly applied in coupling the plug and its socket in the battery case to actuate the circuit-making mechanism in the latter. This device is, therefore, safe to use in shot-firing systems, and convenient to employ in situations where a source of current is required momentarily. Furthermore, it is to be noted that the battery case embodying the present invention is completely sealed, so that the battery therein can only be used in the prescribed manner.

While a preferred construction is illustrated and described, it is to be understood that variations may be made without departing from the scope and spirit of the invention.

I claim:

1. A portable self-contained electric current supply device comprising a case having a partition dividing it into two compartments, a battery in one of said compartments, circuit control mechanism in the other compartment, the latter compartment being permanently closed except for an aperture in one wall normally closed by a part of said mechanism, said mechanism normally and automatically opening a circuit including said battery and operable to close such circuit by the insertion of terminal means througn such aperture.

2. A portable self-contained electric current supply device according to claim 1, wherein said case is tubular, said battery is insertable into and removable from one end of said case and in circuit therewith, and said aperture is in the opposite end of said case and normally occupied by a part of said mechanism.

3. A portable self-contained electric current supply device comprising a case having an apertured cover at one end; a battery within said case; circuit control mechanism within said case between said cover and said battery including a member normally opposite the aperture in said cover; such member being depressible by terminal means inserted into said aperture and automatically returning to its normal position upon removal of such terminal means; a resiliently mounted plunger carrying said depressible member, and a guide for said plunger having a neck secured in the aperture of said cover, the interior of said neck and said depressible member and plunger being engageable by said terminal means.

4. A portable self-contained electric current supply device comprising a tubular case having a centrally apertured cover secured to one end, a closure cap detachably coupled to its other end, and a centrally apertured insulating partition between said ends; a dry battery in said case having its top end bearing against said partition and its central electrode opposite the aperture therein; and circuit control mechanism in said case between said partition and said cover, including a conductive pin, an insulating plunger carrying said pin and movable axially of said case, a guide for said plunger secured to said cover, and a spring carried by said guide and yieldingly supporting one end of said plunger and pin adjacent the aperture in said cover.

5. A portable self-contained electric current supply device comprising a case having means dividing it into two closed compartments adapted to remain closed during the operation of said device, one compartment having an opening for the insertion and removal of a battery, a battery sealed in said compartment against unauthorized removal, and circuit control mechanism in the other compartment, said other compartment having an aperture normally occupied and closed by a part of said mechanism.

6. The combination with a battery case having an opening for the insertion and removal of a battery, of means comprising a device secured at separate points on the wall of said case and having portions extending across said case adjacent said opening to seal the battery in said case, and of a detachable closure cap for said opening carrying a battery supporting member that is adapted to project past the plane of said seal to bear against a battery in said case.

7. A portable self-contained electric current supply device comprising a case having an abutment therein and also having an opening for the insertion and removal of a battery; a battery in said case; means comprising a wire secured at separated points on the wall of said case and having portions extending across the space adjacent said opening to seal said battery in said case; and a detachable closure cap for said opening carrying a conductive battery-engaging member that projects past said seal and holds said battery against said abutment.

8. A portable self-contained electric supply device comprising a battery case adapted to be electrically connected to one pole of the battery, said case having an aperture therein the edge of which forms a contact for one side of an external circuit, a second contact within said case and insulated therefrom and adapted to be electrically connected to the other pole of the battery, means adapted to be manually operated in one direction to form an electrical connection between the said second contact and the other side of an external circuit, and resilient means adapted to operate said latter means in the opposite direction to break said latter connection upon releasing the manual force.

9. A dual contact terminal plug safety socket comprising a fixed contact member having a hole therein, a second fixed contact member within the axial line of said hole, a third movable contact in the axial line of said first and second contact members and located therebetween and adapted to make contact with said second contact member, and resilient means adapted to normally maintain said movable contact out of electrical contact with said second contact member.

10. A dual contact terminal plug safety socket comprising a fixed contact member having a hole therein, a second fixed contact member in the axial line of said hole, a third movable contact interposed between said fixed contacts in the axial line of said hole and adapted to make contact with said second contact member, a head secured to said movable contact, and resilient means for normally maintaining said movable contact out of electrical contact with said second fixed contact and for maintaining said head in said hole to thereby seal said hole against the entry of deleterious substances.

11. A dual contact terminal plug safety socket comprising a fixed contact member having a hole therein, a second fixed contact member in axial line with said hole, a third movable contact interposed between said fixed contacts, a guide depending from and carried by said first fixed contact member, a slide of electrical insulative material cooperating with said guide and carrying said movable contact, a head on said guide having a countersunk portion into which the outer end of said movable contact terminates, and resilient means for urging said head into said hole and for urging said movable contact out of contact with said second contact.

In testimony whereof, I affix my signature.

RALPH R. SMITH.